United States Patent
Paul

(10) Patent No.: US 7,366,734 B2
(45) Date of Patent: Apr. 29, 2008

(54) ENABLING CLIENT SYSTEMS TO DISCOVER SERVICES ACCESSIBLE BY REMOTE PROCEDURE CALLS (RPC) ON SERVER SYSTEMS

(75) Inventor: Gaurab Paul, Redwood Shores (IN)

(73) Assignee: Oracle International Corporation, Redwood Shores, CA (US)

(*) Notice: Subject to any disclaimer, the term of this patent is extended or adjusted under 35 U.S.C. 154(b) by 450 days.

(21) Appl. No.: 10/905,298

(22) Filed: Dec. 25, 2004

(65) Prior Publication Data

US 2006/0173849 A1    Aug. 3, 2006

(51) Int. Cl.
*G06F 17/30* (2006.01)
(52) U.S. Cl. .................................. 707/104.1
(58) Field of Classification Search ............. 707/104, 707/100; 719/330, 328, 249
See application file for complete search history.

(56) References Cited

U.S. PATENT DOCUMENTS 5,497,463 A * 3/1996 Stein et al. .................. 709/203
5,682,534 A * 10/1997 Kapoor et al. .............. 719/328
7,203,948 B2 * 4/2007 Mukundan et al. ......... 719/330
2004/0255048 A1 * 12/2004 Lev Ran et al. ............ 709/249
2005/0131925 A1 * 6/2005 Coker et al. ................ 707/100

OTHER PUBLICATIONS

W. Richard Stevens, Chapter Entitled, "Sun RPC", in a book entitled, "UNIX Network Programming vol. 2—Interprocess Communication", Prentice Hall, 1999, 2nd edition, Chapter 16, p. No. 399-452, pages.

* cited by examiner

*Primary Examiner*—Jean M. Corrielus
*Assistant Examiner*—Noosha Arjomandi
(74) *Attorney, Agent, or Firm*—Narendra Reddy Thappeta

(57) ABSTRACT

Information representing the RPC servers on which each RPC service is currently being provided, is maintained on a directory server. A client may query the directory server and determine a specific one of the RPC servers on which to cause execution of a desired RPC service. Each RPC server may also register the service interface using which the corresponding RPC services can be accessed. As a result, the same RPC service may potentially be accessed with a different service interface on different RPC servers. Another aspect of the present invention provides a schema using which procedure interface definition (i.e., the name of the procedure, the parameters and their attributes) can be represented. Such a feature is used to store the procedure definitions on the directory server, thereby enabling a client system to determine the procedure definition prior to sending an RPC request to execute the procedure.

33 Claims, 7 Drawing Sheets

```
301: [
303:    UUID(807B9154B46E-1F65-E034-0800208AB384),
305:    version(1),
307:    endpoint(RSLV),
309:    address_desc(service_endpoint),
311:    rslv_server(ANSWER),
313:    svcreg(server_ldap)
315:] myService

316: {

318: typedef struct {
320:    [size_in(-1)] ub4 member1_aggregate1[2];
322:            oratext *member2_aggregate1;
324: } aggregate1_t;

326: typedef ubig_ora maxlength;

328: [size_is(maxlength) sb4[ptrmemory]remoteproc1([in] aggregate1_t parameter ub4*parameter2);

401: ( <oid> NAME 'FunctionName'
403: DESC 'The name of a C function'
405: EQUALITY caseExactMatch
407: SUBSTR caseExactSubstringsMatch
409: SYNTAX 1.3.6.1.4.1.1466.115.121.1.15 SINGLE-VALUE )

410: ( <oid> NAME 'FunctionPrototype'
412: DESC 'The prototype of a C function'
414: EQUALITY caseExactMatch
416: SUBSTR caseExactSubstringsMatch
418: SYNTAX 1.3.6.1.4.1.1466.115.121.1.15 SINGLE-VALUE )

419: ( <oid> NAME 'ArgumentName'
421: DESC 'An argument name to a C function'
423: EQUALITY caseExactMatch
425: SUBSTR caseExactSubstringsMatch
427: SYNTAX 1.3.6.1.4.1.1466.115.121.1.15 SINGLE-VALUE )

428: ( <oid> NAME 'ArgumentType'
430: DESC 'The native or derived type of an argument to a C function'
432: EQUALITY caseExactMatch
434: SUBSTR caseExactSubstringsMatch
436: SYNTAX 1.3.6.1.4.1.1466.115.121.1.15 SINGLE-VALUE )

437: ( <oid> NAME 'MemberOf'
439: DESC 'This is a member of which C based aggregate'
441: EQUALITY caseExactMatch
443: SUBSTR caseExactSubstringsMatch
445: SYNTAX 1.3.6.1.4.1.1466.115.121.1.15 SINGLE-VALUE )

446: ( <oid> NAME 'ReturnType'
448: DESC 'The type of return value of a C function '
450: EQUALITY caseExactMatch
452: SUBSTR caseExactSubstringsMatch
454: SYNTAX 1.3.6.1.4.1.1466.115.121.1.15 SINGLE-VALUE )

*FIG. 4A*

455: ( <oid> NAME 'FunctionObject'
457: DESC 'The root object specific to a C function'
459: SUP Top
460: STRUCTURAL MUST ( FunctionName $ FunctionPrototype )
462: MAY ( ReturnType $ description ) )

464: ( <oid> NAME 'FunctionArgumentObject'
466: DESC 'An argument to the C function'
468: SUP FunctionObject
470: AUXILIARY MUST ( ArgumentName )
472: MAY ( description ) )

474: ( <oid> NAME 'TypeObject'
475: DESC 'The specifics of an argument to the C function, could also be used for user-defined return type if required'
477: SUP FunctionArgumentObject
478: AUXILIARY MUST ( ArgumentType )
480: MAY ( MemberOf $ description ) )

FIG. 4B

ENABLING CLIENT SYSTEMS TO
DISCOVER SERVICES ACCESSIBLE BY
REMOTE PROCEDURE CALLS (RPC) ON
SERVER SYSTEMS

BACKGROUND OF THE INVENTION

1. Field of the Invention

The present invention relates to client-server technologies, and more specifically to a method and apparatus for enabling client systems to discover services accessible by remote procedure calls (RPC) on server systems.

2. Related Art

Remote procedure calls (RPCs) generally enable a client system to request services provided on server systems ("RPC server system"). In a common scenario, a RPC server system is implemented to execute a service upon receiving an RPC request, and a client system causes execution of the service by sending the RPC request. The results of execution of the service are then generally provided to the client system sending the RPC request.

In one prior embodiment, the RPC services are provided on pre_specified RPC server systems according to pre_specified RPC interfaces (e.g., TCP or UDP port number at which to send the request). Thus, any client system requiring execution of a service sends the corresponding RPC request to a RPC server system (on which the service is provided) according to the pre_specified interface.

The approach of above may have several limitations. For example, it may be desirable to provide the same service on different (or additional) RPC servers (e.g., to scale), and the clients systems may not be able to automatically (i.e., without additional configuration which specifically indicates the RPC servers on which each RPC service is accessible) discover the availability of the services on the different RPC servers.

Accordingly what is needed is a method and apparatus which enables client systems to discover services accessible by remote procedure calls (RPC) on server systems.

BRIEF DESCRIPTION OF THE DRAWINGS

The present invention will be described with reference to the accompanying drawings briefly described below.

FIG. 3 depicts the content of an example interface language definition (IDL) file which specifies the service interface and the procedure interface (using which the corresponding procedure can be caused to be executed) in an example embodiment.

FIGS. 4A and 4B together contain a LDAP (X.500) schema definition using which the content of an IDL file can be represented in an embodiment of the present invention.

In the drawings, like reference numbers generally indicate identical, functionally similar, and/or structurally similar elements. The drawing in which an element first appears is indicated by the leftmost digit(s) in the corresponding reference number.

SUMMARY

Figure 1:
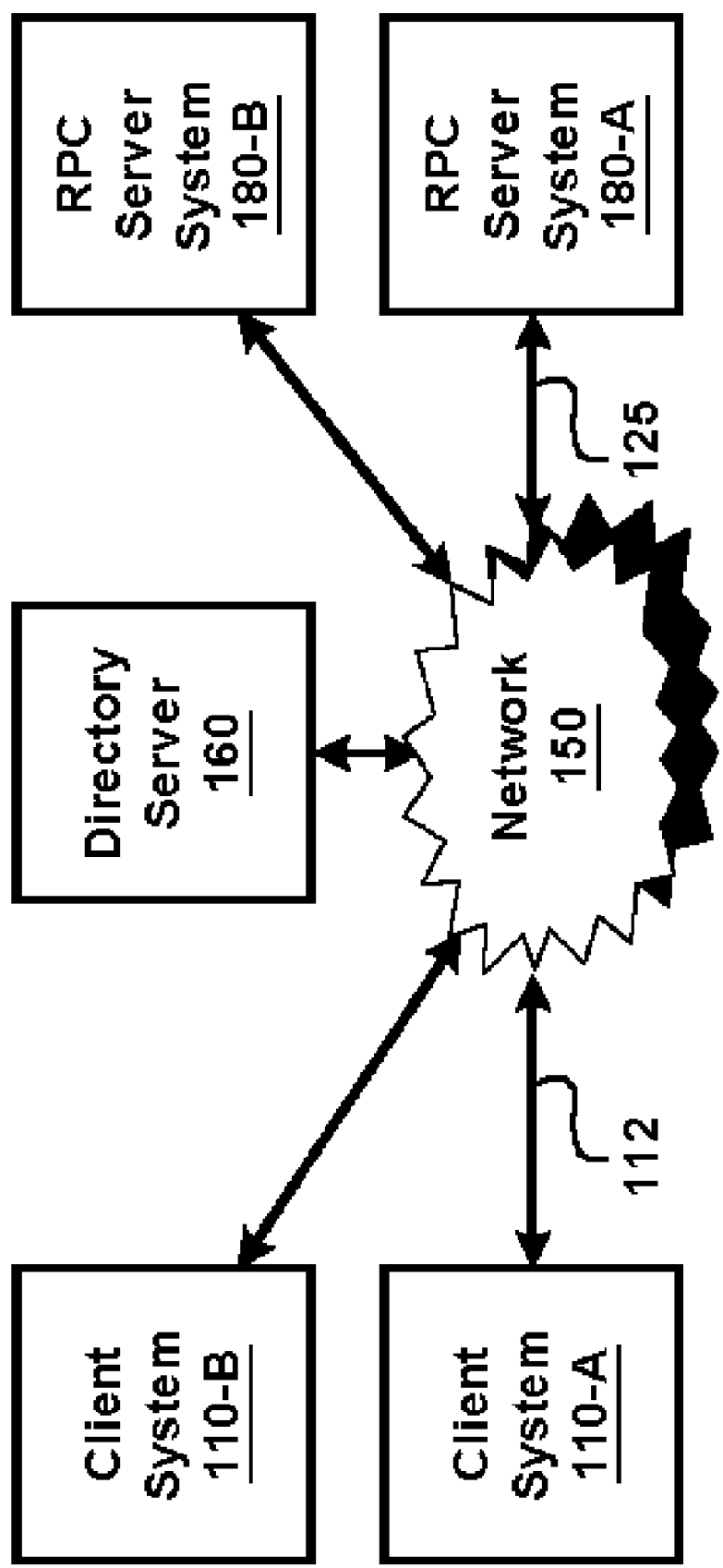
FIG. 1 is a block diagram illustrating an example environment in which various aspects of the present invention can be implemented.

According to an aspect of the present invention, information representing an interface definition using which an RPC server can be executed on a corresponding RPC server, is registered on a directory server. A client system may query the directory server to determine the interface definition, and execute the service by sending an RPC request according to the interface definition to one of the RPC servers.

According to another aspect of the present invention, information representing the specific RPC servers on which a RPC service can be executed, is also registered on a directory server. A client system may query the directory server to as certain specific RPC servers on which the corresponding RPC service can be executed. The client system may execute the RPC service on one of the ascertained RPC servers using the interface definition (also determined by querying the directory server).

According to yet another aspect of the present invention, a query response from a directory server can specify a service interface (e.g., a TCP/UDP port number) at which an RPC service can be executed. The RPC service is executed based on various information received from the directory server(including on a RPC server indicated in a response, the interface definition indicated in the response and the service interface indicated in the response).

Further features and advantages of various aspects of the invention, as well as the structure and operation of various embodiments of the invention, are described in detail below with reference to the accompanying drawings.

DETAILED DESCRIPTION OF THE
PREFERRED EMBODIMENTS

1. Overview

According to an aspect of the present invention, information representing the RPC servers on which each RPC service is accessible, is registered on a directory server. A client system may query the directory server to determine the specific RPC servers on which a desired service is accessible, and cause execution of the desired service by sending an appropriate RPC request to any of the determined RPC servers.

As a client system may dynamically determine the specific RPC server on which a desired service is available, the services accessible by RPC may be provided on any server.

According to another aspect of the present invention, each RPC server providing the service also registers (on a directory server) a corresponding interface definition, using which the RPC service can be accessed. Accordingly, different interface definitions (e.g., different TCP port numbers) may be associated with different RPC servers for execution of the same service.

One more aspect of the present invention provides a schema (which allows specification of what each data element is and any relationship with other data elements according to a pre_specific convention/language), using which a procedure interface definition can also be specified. Such a feature may be used associated with procedures, which can be caused to be executed as a part of accessing a desired service. In an embodiment, the parameters (arguments) and their attributes are specified in the form of objects hierarchically.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well?known structures or operations are not shown in detail to avoid obscuring the features of the invention.

2. Example Environment

FIG. 1 is a block diagram illustrating the details of an example environment in which the present invention can be implemented. The block diagram is shown containing client systems 110_A and 110_B, directory server 160, network 150, and RPC servers 180_A and 180_B. It should be understood that only representative systems are included in the figure for illustration. However, many more systems are generally contained in typical environments. Each system of FIG. 1 is described below in further detail.

Network 150 provides connectivity between all the remaining systems of FIG. 1, and may be implemented using protocols such as IP in a known way. Directory server 160 receives directory queries and responds to the queries based on the information stored in (or otherwise made available to) directory server 160. As described in sections below, directory server 160 enables client systems to discover the RPC servers on which desired RPC services can be accessed.

RPC servers 180_A and 180_B are implemented to execute RPC services upon receipt of corresponding requests from client systems 110_A and 110_B. In general, each RPC server executes processes to receive RPC requests according to a pre_specified interface, and to provide the services specified in the RPC requests. RPC servers can be implemented on enterprise level operating systems such as Solaris, Windows XP, Linux, HP Unix etc.

Each client system 110_A and 110_B sends RPC requests to the specific RPC servers providing the corresponding services. An aspect of the present invention enables client systems to discover services accessible by remote procedure calls (RPC) on server systems using directory server 160, as described below with reference to FIGS. 2A and 2B.

3. Enabling Client Systems to Discover RPC Services

Figure 2A:
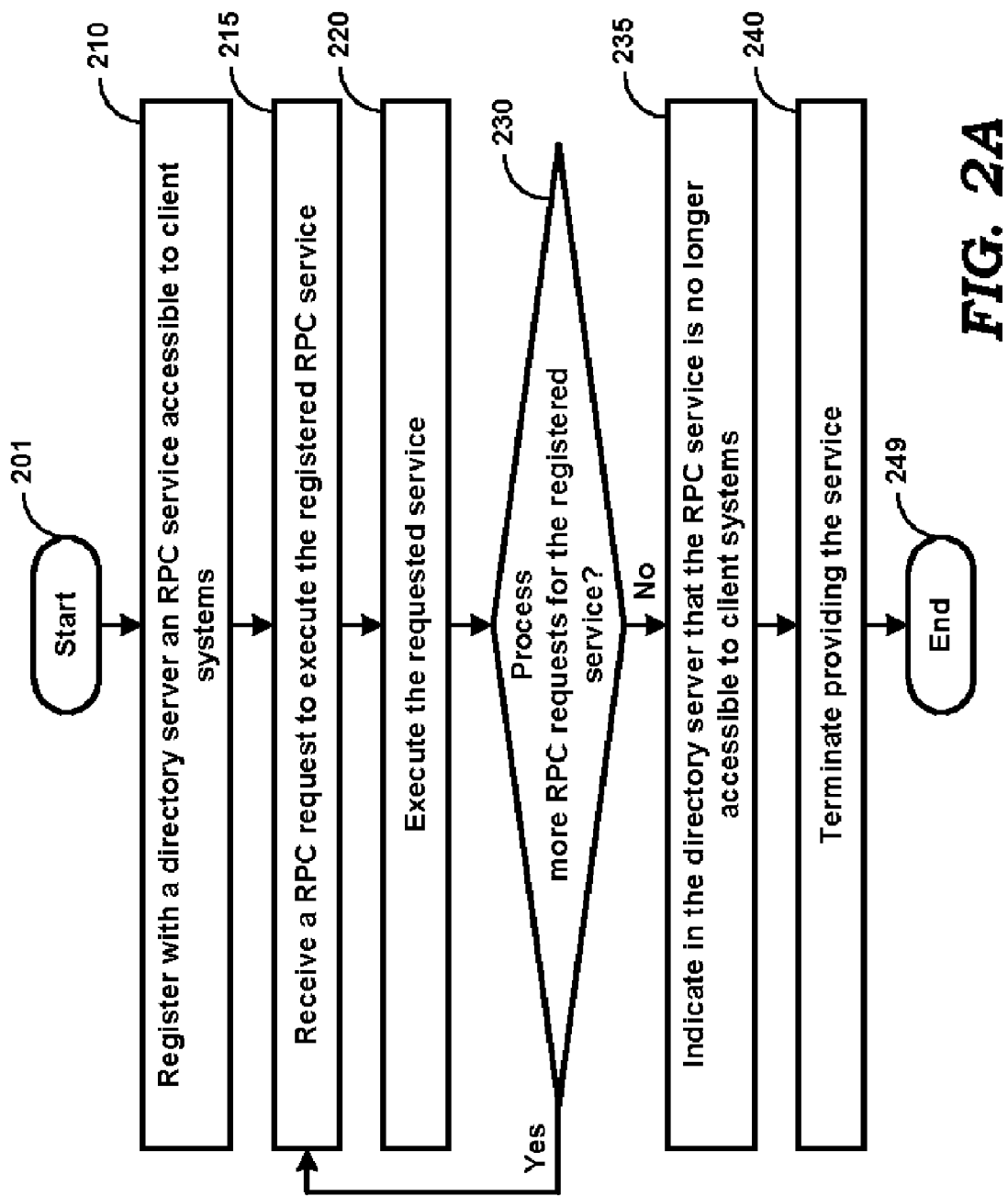
FIG. 2A is a flow_chart illustrating the operation of an RPC server in enabling a client to discover the available services (accessible on the RPC server) in an embodiment of the present invention.

FIG. 2A is a flow_chart illustrating the manner in which an RPC server may operate to enable client systems to discover (and then send requests to execute) the corresponding RPC services. The flowchart is described with reference to FIG. 1 for illustration. However, the approaches can be implemented in other environments as well. The flow_chart begins in step 201, in which control immediately passes to step 210.

In step 210, RPC server 180_A registers with directory server 160 an RPC service accessible to client systems. Such registration may be performed when RPC server 180_A is initialized, for example, as a part of booting_up RPC server 180_A. In general, the registration can be according to any pre_specified convention.

In step 215, RPC server 180_A receives a RPC request to execute the registered RPC service. The request needs to be received according to pre_specified interface conventions. In step 220, RPC server 180_A executes the requested service.

In step 230, RPC server 180_A determined whether to process more RPC requests for the registered service. A determination not to process more requests can be made, for example, before shutting down RPC server 180_A. Control passes to step 215 if more RPC requests are to be processed.

In step 235, RPC server 180_A indicates in the directory server that the RPC service is no longer accessible to client systems. Such indication may be provided either by removing the registration information, or alternatively by merely setting an appropriate flag in directory server 160. In step 240, RPC server 180_A terminates providing the service and the method ends in step 249.

The manner in which client systems 110_A and 110_B can operate to discover the RPCs servers on which a desired RPC service is accessible, is described below with respect to FIG. 2B.

4. Operation of Client System

Figure 2B:
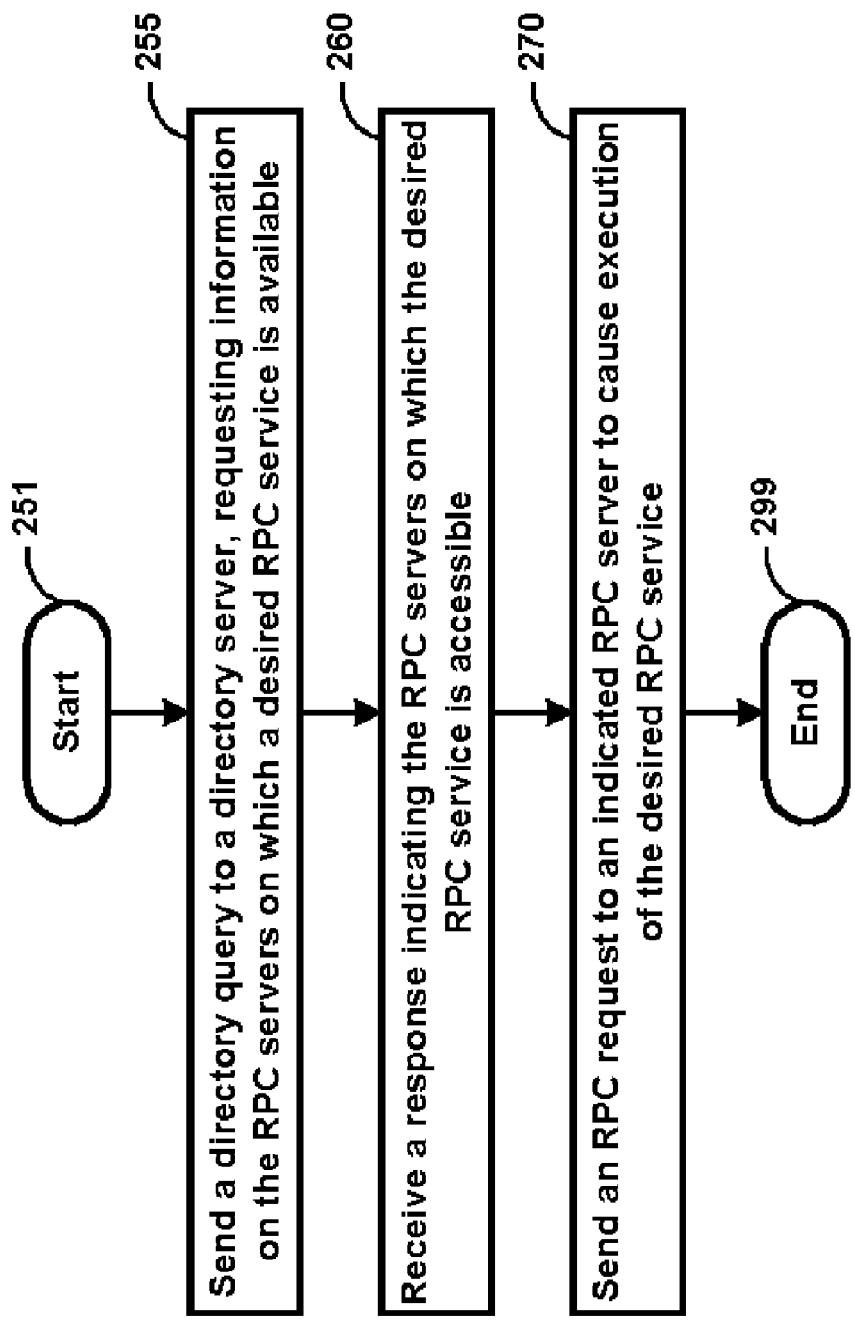
FIG. 2B is a flow_chart illustrating the operation of a client system in determining the RPC servers on which a desired RPC service is available for execution, in an embodiment of the present invention.

FIG. 2B is a flowchart illustrating the manner in which client systems 110_A and 110_B can execute desired RPC services, according to various aspects of the present invention. The flowchart is described with reference to FIGS. 1 and 2A for illustration. However, the approaches can be implemented in other environments and in combination with other types of registration approaches, as well. The flowchart begins in step 251, in which control immediately passes to step 255.

In step 255, client system 110_A sends a directory query to directory server 160, requesting information on the RPC servers on which a desired RPC service is available. In step 260, client system 110_A receives from directory server 160 a response indicating the RPC servers on which the desired RPC service is accessible. The query and response can be according to any pre_specified protocol. In an embodiment, light_weight directory access protocol (LDAP) version V.3 is used for the query and response.

In step 270, client system 110_A sends an RPC request to an indicated RPC server to cause execution of the desired RPC service. The RPC request can be sent using known interfaces. The flowchart ends in step 299.

Thus, using the approaches described above, client systems can determine the specific RPC server systems on which desired RPC services are accessible, and can cause the service to be executed on one of the determined RPC servers. However, it may be appreciated that typical systems need to be implemented with various enhancements. The description is continued with respect to some desired example enhancements, and then the manner in which various aspects of the present invention provide such desired enhancements.

5. Enhancements

It is often desirable that different RPC servers be accessed with different interface parameters for the same service. For example, the TCP port number at which a service is accessible can be different in different RPC servers, thereby facilitating avoidance of conflict for the same port number (for different services).

In addition, in environments in which a client system can cause execution of specific one of procedures provided as a part of the RPC service, it may be desirable to register the procedure identifiers (as illustrated with reference to examples in below sections) and the details of various parameters ("procedure interface") using which the procedures can be executed. Furthermore, different RPC servers may wish to restrict access (of different RPC services) to different sets of client systems.

Various aspects of the present invention enable such features described below with various examples.

6. Interface Definition Language (IDL) File

FIG. 3 illustrates the detail of an IDL file in an example embodiment. The file content is generated by incorporating appropriate data elements into corresponding portions of the template. In the prior embodiments, the IDL file is compiled on the RPC server providing the service using tools which are generally specific the environment of implementation, and then made available in a pre_specified directory on the RPC server. Any client system generally accesses the file and links the information to various RPC requests, in a known way. The reader is referred to a document entitled, "CAE Specification, DCE 1.1: Remote Procedure Call_ Document Number: C706", available from The Open Group, Apex Plaza, Forbury Road, Reading Berkshire, RG1 1AX, United Kingdom.

Various aspects of the present invention enable the information in the IDL file to be represented on directory server 160 such that client systems can generate corresponding queries without having to access the IDL file (or compiled version thereof), as described below. Thus, the content of the IDL file of FIG. 3 is used to demonstrate various aspects of the present invention. The content corresponds to a situation in which there is one procedure provided within a service definition. It should be appreciated that the IDL differs from environment to environment, and several IDLs are well known in the relevant arts.

Lines 301?315 contain attributes for a corresponding RPC service. Line 303 indicates the unique identifier for the RPC service using the key_word UUID. The name for the service is indicated in line 315. Line 305 indicates that the present version of the RPC service is 1. Line 307 indicates the transport or session level protocol using which the communication between the RPC client and server is allowed to happen. Line 309 indicates the machine name (with an IP address), the port number of the RPC server, at which the RPC service is accessible (service_endpoint). It may thus be appreciated that different servers can specify different service end points (port numbers) while providing the same service. Line 313 specifies the identifier for the directory server with which the service is registered (svcreg(server_ Idap)).

Lines 318_324 define a structure aggegate1_t (containing ub4 or a basic C language type of size 4 bytes variable), and line 326 defines another variable ubig_ora (C language unsigned long variable of maxlength type.

Line 328 defines a procedure remoteprocl (within the service myService), which could be executed by a client system. The procedure remoteprocl is shown with parameter1 of type aggregate1_t as an input parameter, and parameter2 as pointer to ub4 as both an input variable and an output variable (an example of pass by reference).

It may be appreciated that information such as that contained in lines 316_330 may also need to be stored in directory server 160 such that client system 110_A can cause execution of the specific procedures (remoteprocl, in the above example) of interest. As aspect of the present invention provides a schema template, using which the procedure definition can be represented as described below in further detail.

7. Schema Template to Specify Procedure Definition

Broadly, a procedure definition is specified using (1) object definitions; (2) attribute definitions; (3) relationship among objects; and (4) relationship among objects and attributes. (1), (3) and (4) are illustrated with reference to FIG. 4B, and (2) is illustrated with reference to FIG. 4A.

With respect to FIG. 4A, lines 401_409 defines properties for attribute 'FunctionName'. The description (DESC) of line 403 indicates that this attribute corresponds to a C function. The property Equality of line 405 indicates that searches are based on exact matching string (when searched by client system 110_A). Line 407 indicates that even substring matches are based on exact matching string. Line 409 indicates the function name is to be received in ASCII format and that it is a single value.

Thus, when a search request related to a procedure name is received from client system 110_A, directory server 160 uses the properties defined above in determining matching procedure names. On the other hand, a top level search could be performed on the directory server for all the RPC interfaces available and their arguments specific details. The result obtained could be used by client system 110_A to determine which of these procedures is to be executed.

Lines 410_418 define the properties for attribute 'FunctionPrototype' (i.e., how client system 110_A can access the procedure). The properties of lines 414, 416 and 418 are respectively the same as in lines 405, 407 and 409.

Lines 419_427 define the properties for attribute 'ArgumentName' (i.e., the names of input and output parameters used by the procedure). The properties of lines 423, 425 and 427 are respectively the same as in lines 405, 407 and 409.

Lines 428_436 define the properties for attribute 'ArgumentType' (i.e., the type of the parameters). The properties of lines 432, 434 and 436 are respectively the same as in lines 405, 407 and 409.

Lines 437_445 define the properties for attribute 'MemberOf' (i.e., specifies whether the attribute is a part of another attribute for example, if an C language basic type int is a member of a C language aggregate (structure or union), and enables hierarchical definition of attributes). The properties of lines 441, 443 and 445 are respectively the same as in lines 405, 407 and 409.

Lines 446_454 define the properties for attribute 'ReturnType' (i.e., the type of return parameters of a procedure. Depending on the third generation high level language, this could be null). The properties of lines 450, 452 and 454 are respectively the same as in lines 405, 407 and 409.

The attributes thus defined can be used to complete the procedure definition in terms of objects, as described below.

8. Object Definitions

With respect to FIG. 4B, lines 455_462 defines the properties of the object class 'FunctionObject'. Line 457 (DESC or description) contains a comment indicating that the object class is a root object specific to a procedure (in a service). Line 459 (SUP) indicates that the FunctionObject is a root object (at the top). Line 460 indicates that the structure of FunctionObject must contain the attribute FunctionName (defined above in lines 401_409 of FIG. 4A) of FIG. 4A. and may contain attribute ReturnType and a description as noted in line 462.

Lines 464 to 472 indicates the properties of the object class 'FunctionArgumentObject'. The comment of line 466 indicates that the object is an argument (input parameter) to the procedure. Line 468 indicates that the present object is a child of the FunctionObject. Line 470 indicates that the attribute that must be present is an ArgumentName (defined above in lines 419_427 of FIG. 4A).

Line 474_480 indicates the properties of object class 'TypeObject'. The comment of line 475 indicates that the object is for the input parameter or a ReturnType (output parameter). Line 477 indicates the present argument is a child of the FunctionArgumentObject, and line 478 indicates that the attribute used by the TypeObject is ArgumentType (defined above in lines 428_436). A parameter could also be a member of an aggregate. In such a case, the MemberOf attribute species the nesting of the parameter. For instance, if a member name "mem1" is a member of an aggregate "aggr1", the MemberOf parameter for the TypeObject specific to "mem1" would contain the aggregate name specific to "aggr1". It may be noted that "aggr1" would have a TypeObject specific to itself.

The Schema data of Appendix A contains schema representation for IDL file of FIG. 3 which is extended from the schema template of FIGS. 4A and 4B (and specific to an Oracle Internet Directory Server based implementation), which is described below in further detail.

9. Schema Data Using an LDIF File

Continuing now with combined reference to Appendix A, the IDL file of FIG. 3 and the schema template of FIGS. 4A and 4B, lines 3_120 of Appendix A defines various object classes, attributes and their properties according to schema template of FIG. 4A. Lines 122 to 177 are shown containing the objects corresponding to the procedure definition of lines 301_330 of FIG. 3. Lines 179_192 contain various access control privileges for the various client systems. As may be appreciated, different server systems may allow access of services to different sets of client systems, due to the access control privileges. The lines of Appendix A are described briefly below.

Lines 1 and 2 specify the particular node in the object tree in the directory server below which all the RPC specific entries shall reside. This could be modified across implementations. Lines 3_49 contain various attributes with corresponding properties, which are used in the object definition (described below with reference to lines 122_147 of Appendix A) of an RPC service stored in directory server 160. Each attribute is referenced through the value of the property 'NAME'. Thus, starting in lines 4, 9, 15, 21, 27, 33, 39, and 45, the properties of attributes 'orclNetROInterfaceName', 'orclNetROInterfaceBinaryAttribute', 'orclNetROSvcReg', 'orclNetROInterfaceAttributeName','orclNetROInterfaceAttributeParameterName', 'orclNetROInterfaceAttributeParameterArgument', orclNetROInterfaceAttributeParameterType', 'orclNetROInterfaceAttributeParameterValue') are respectively defined. As may be appreciated properties DESC, EQUALITY, SUBSTR, SYNTAX for each corresponding Attribute is shown in 4 distinct lines below the NAME property for the attribute, consistent with the conventions of FIG. 4A.

Lines 51_85 are shown containing properties of corresponding attributes used in definition of object classes for structures of data_types stored in directory server 160. Thus, starting at lines 51, 57, 63, 69, 75, and 81, the properties of attributes with NAMEs 'orclNetROTypeName', 'orclNetROTypeKind', 'orclNetROTypeMemberOf', 'orclNetROTypeAggregateSize2', 'orclNetROTypeAttributeName', and orclNetROTypeAttributeParameter are respectively defined, also consistent with the conventions of FIG. 4A.

Lines 87_120 are shown containing attributes and corresponding properties used in definition of object classes for Procedures within a Service. Thus, starting at lines 87, 92, 98, 104, 110, and 116, the properties of attributes 'orclNetROProcedureName', 'orclNetROPrototype', 'orc NetROParameterName', 'orclNetROParameterType', 'orclNetROParameterAttributeName', and 'orclNetROParameterAttributeArgument' are respectively defined, also consistent with the conventions of FIG. 4A.

Lines 122_177 of Appendix A are shown containing procedure definitions in terms of objects (according to the template of FIG. 4B) for an RPC service, structures of datatypes and procedures in an RPC service. The lines corresponding to each portion are described below.

Lines 122_147 contain definitions of object classes corresponding to an RPC service. Lines 122_127 of Appendix A indicate the root object class associated with an RPC service. Client systems generally request execution of procedures of an RPC service by accessing an RPC service using attributes which indicate the RPC service name/interface name registered (orclNetROInterfaceName attribute) with directory server 160. Thus, line 126 indicates that object class 'orclNetROInterfaceObject' use properties of attribute orclNetROInterfaceName (of Lines 4_8) and orclNetROSvcReg (Lines 15_19) while performing a search in directory server 160 to process a request from client system.

Line 132 indicates that the previously defined (in line 9) attribute orclNetROInterfaceBinaryAttribute is used by the object class orclNetROInterfaceBinaryObject defined starting from line 129. The attribute is used by directory server 160 while storing and further while processing a query from client systems for object class definitions of an RPC service. Similar relationship exists between attribute orclNetROInterfaceAttributeName (line 138) with object class orclNetROInterfaceAttributeObject (defined starting at line 135), as well as attributes orclNetROInterfaceAttributeParameterName (line 144), orclNetROInterfaceParameterArgument (line 145), orclNetROInterfaceAttributeParameterType (line 146), and orclNetROInterfaceAttributeParameterValue (line 146) with orclNetROInterfaceAttributeParameterObject (Line 141).

Similarly, lines 149_159 specify object classes for representing structure of data types using corresponding attributes (lines 153_153, 158_159). Object class orclNetROTypeObject (of line 149) is defined using attributes orclNetROTypeName (Line 152), orclNetROTypeKind (152), orclNetROTypeMemberOf (Line 153) and orclNetROTypeAggregateSize. Similarly, object class orclNetROTypeAttributeObject (of line 155) is defined using orclNetROTypeAttributeName (Lines 158) and orclNetROTypeAttributeParameter (Line 159).

Lines 161_177 are shown containing object classes for representing a procedure in a service with corresponding relation to the attributes. The object classes orclNetROProcedureObject (lines 161), orclNetROProcedureParameterObject (line 167) and orclNetROProcedureParameterAttributeObject (line 173) used for representing a procedure as an object are shown using corresponding attributes orclNetROProcedureName and orclNetROPrototype (line 164), orclNetROParameterName and orclNetROParameterType (line 170), orclNetROParameterAttributeName (176) and orclNetROParameterAttributeArgument (Line 177).

The schema definition specifies a logical language in which the entries for any RPC interface could be stored in the directory server. The schema definition is loaded into the directory server before any entry specific to any RPC service could be stored in the directory server. The loading of the schema of Appendix A into the directory server is done using several known (e.g., ldapadd, ldapmodify etc provided by Oracle Corporation, Redwood shores, Calif., USA) tools. According to one approach, the interchange format file is manually generated (in a format suitable for loading onto directory server 160) for the schema. In the case of LDAP directory server, the interchange format file is referred to as LDIF file (LDAP Interchange Format File). The content of LDIF file specifying the schema is contained in Appendix A. This schema is an extension from the schema templates of FIGS. 4A and 4B, specifying the language in which RPC specific interface entries shall be stored in the directory server and necessary to be loaded into the directory server (an one_time operation) before actual entries specific to an interface (as explained in the Appendix B) are loaded into the directory server.

10. LDIF File for RPC Interface Data

Appendix B depicts the contents or entries in the LDIF file for the object class definitions of Appendix A, and the IDL file of FIG. 3. The LDIF file is provided here to explain the relevant entries only. The entries are stored (export/search/add/delete/modify etc) in the directory server by the runtime RPC library interfaces which are implemented on top of the LDAP protocol, in a known way (application programmer interface set for interaction with any directory server). The content of Appendix B is described below briefly.

Lines 1_8 of Appendix B indicate the name space hierarchy under which the object classes are defined. Such hierarchy provides a unique universal resource locater which the information in the object classes can be queried and accessed. Thus, client systems use the unique locators in accessing the procedures in the service.

Lines 10_20 are shown representing objects used in defining a RPC service. The orclNetROInterfaceName (of line 16) attribute for the Object class 'orclNetROInterfaceObject' (line 15) indicates that service defined using LDIF file of Appendix B corresponds to myService (Line 315 of FIG. 3). Line 17 (corresponding to line 313 of FIG. 3) indicates that the service is registered with directory server 160 with the attribute orclNetROSvcReg. Attribute orclaci (line 18 and line 19 together) indicates access control privileges for client systems to access the service.

Lines 21_24 contain representation of an attribute (UUID of line 303), associated with the RPC service (myService). The object class orclNetROInterfaceAttributeObject (line 22) contains a value 'UUID' for the associated attribute orclNetROInterfaceAttributeName in line 23 according to definition of this object class (lines 135_139 of Appendix A).

Lines 25_28 contain representation of a parameter value for the attribure UUID (values enclosed within brackets following UUID of line 303) indicating an unique identifier for the RPC service (myService), which is stored in directory server 160. The object class orclNetROInterfaceAttributeParameterObject (line 26) contains a value '807B9154B46E_1F65_E034_0800208AB384' for the associated attribute orclNetROInterfaceAttributeParameterName in line 27 according to definition of this object class (lines 141_147 of Appendix A).

Lines 29_32 contain representation of a parameter value for the attribute 'version' (line 305) indicating the present version of the service (myService) on RPC server. The object class orclNetROInterfaceAttributeObject (line 30) contains a value 'version' for the associated attribute orclNetROInterfaceAttributeName in line 31 according to definition of this object class (lines 135_139 of Appendix A).

Lines 33_36 contain representation of a parameter value for the attribure version (values enclosed within brackets following UUID of line 305) indicating that the present version of the service 'myService' available on RPC server is 1. The object class orclNetROInterfaceAttributeParameterObject (line 34) contains a value '1' for the associated attribute orclNetROInterfaceAttributeParameterName in line 35 according to definition of this object class (lines 141_147 of Appendix A).

Lines 37_40 and 41_45 contain representation of attributes (endpoint of line 307) and the corresponding parameter value (RSLV of line 307), which are based on object class definitions for orclNetROInterfaceAttributeObject (lines 135_139 of Appendix A) and orclNetROInterfaceAttributeParameterObject (lines 141_147 of Appendix A).

Lines 46_49 and 50_54 contain representation of an attribute (address_desc of line 309) and the parameter value (service_endpoint of line 309), which are based on object class definitions for orclNetROInterfaceAttributeObject (lines 135_139 of Appendix A) and orclNetROInterfaceAttributeParameterObject (lines 141_147 of Appendix A).

Lines 55_58 and 59_63 contain representation of an attribute (rslv_server of line 309) and the parameter value (ANSWER of line 309), which are based on object class definitions for orclNetROInterfaceAttributeObject (lines 135_139 of Appendix A) and orclNetROInterfaceAttributeParameterObject (lines 141_147 of Appendix A).

Lines 64_68 contain representation of a data structure used by myService (aggregate1_t of line 324). As may be observed from line 65, representation of such a structure is based on object class definition of the object orclNetROTypeObject (Lines 149_153 of Appendix A). Attributes orclNetROTypeName and orclNetROTypeKind has corresponding values as 'aggregate_1' and 'typedef structure' as indicated in lines 66 and 67.

Lines 69_75 contain representation of a member of the data strucure aggregate1_t (member1_aggregate1 as in line 320 of IDL definition of FIG. 3), using object class definition of orclNetROTypeObject (line 70) and corresponding attributes (in lines 71_75) according to the object definition in lines 149_153 of Appendix A. Similarly lines 86_91 represent another member of the data structure aggregate1_t (member2_aggregate1 as in line 322 of FIG. 3).

Lines 76_85 contain definition of an attribute (size_in of line 320) according to the definition of the object class orclNetROTypeAttributeObject (lines 155_159 of Appendix A). Lines 92_97 contain represenation of yet another data structure ('maxlength' in line 326) according to object class definition of orclNetROTypeObject (lines 149_153 of Appendix A).

Lines 98_102 contain representation of a procedure (remoteproci in line 328) which can be accessed in the service (myService). The procedure is represented according to object class definition (line 161_165) for a corresponding object (orclNetROProcedure in line 99). The attributes associated with the object class are contained in lines 100_102.

Lines 103_108 contain representation of a type of the parameter resulting from the execution of the procedure remoteproc1 (sb4 of line 328) according to the definition of object class orclNetROPrcoedureParameterObject (lines 167_171 of Appendix A).

Lines 109_113 contain representation of an attribute for the parameters received from the client system for execution of procedure remoteproc1 and resulting after the execution of the procedure. Such a representation is based on definition of an object class 'orclNetROProcedureParameterAttributeObject' (lines 173_177 of Appendix A).

Lines 141_119 and 125_130 contain representation of parameters (parameter1 and parameter2 respectively of line 328) according to the object definition of orclNetROProcedureParameterObject (lines 167_171 of Appendix A).

An attribute associated with the parameter (parameters of line 328) is represented in lines 120_124 according to object definition of 'orclNetROProcedureParameterAttributeObject' (lines 173_177 of Appendix A). Similarly, attributes (in, out of line 328) of another parameter 'parameter2' (line 328) are represented in corresponding lines 131_134 and 135_139 according to definition of object class 'orclNetROProcedureParameterAttributeObject' (lines 173_177 of Appendix A).

These string entries are dynamically constructed by implementing RPC library interfaces. RPC library interfaces are written on top of the LDAP protocol, known way (application programmers interface set for interaction with the LDAP server). Using these interfaces these entries are loaded onto directory server 160, and client systems 110_A and 110_B may discover the servers (and corresponding interfaces) on which a desired service can be accessed, as described below with example transactions.

11. Interaction Between Client System and Directory Server

In general, client system 110_A generates directory queries to determine the service interface and the procedure interface. Client system 110_A can potentially query for all the services registered with directory server 160 (if that information is not already known), or only the specific service of interest. As noted above, in an embodiment, directory server 160 is implemented according to LDAP, and the manner in which the queries can be generated is described below with examples.

In general, an LDAP query needs to specify (a) base distinguished name (an entry where to start searching); (b) scope (the scope of the search); (c) filter (what to search for); and (d) attributes and attributes_only (the type of information/attributes which are to be returned).

Thus, for example, assuming that client system 110_A need to generate a directory query for "remoteproc1" in line 98 of appendix B, the LDAP query may be formed as follows:

(a) the base distinguished name:
dn:orclNetROProcedureName=remoteproc1,
orclNetROInterfaceName=myService,
cn=orclnetRemoteopsInterfaceRegistration,
cn=OracleNetRemoteOps,cn=OracleNet,cn=Products,
cn=OracleContext,%s_SubscriberDN%

(b) scope: LDAP_SCOPE_BASE (only the attributes of the base entry)

(c) filter: "orclNetROProcedureName: remoteproc1"

(d) to get only the prototype: the attributes argument is: {"orclNetROPrototype", NULL}

In response, directory server 160 returns the procedure interface for remoteproc1 in the IDL file.

As another example, with reference to appendix B line 7, to query all the service interfaces which are currently loaded into the directory server, an LDAP query may be formed as follows:

(a) the base distinguished name:
cn=orclnetRemoteOpsInterfaceRegistration,
cn=OracleNetRemoteOps,cn=OracleNet,cn=Products,
cn=OracleContext,%s_SubscriberDN%

(b) scope: LDAP_SCOPE_ONELEVEL (indicating that only one level below the base entry, line number 13 in appendix B; as shown in the Appendix A and B for the Oracle IDL reference implementation, all the remote interface entries lie one level below the base entry in the directory tree for remote interface registration)

(c) filter: "orclNetROInterfaceName=*"

(d) to get only the interface name, the attributes argument is: {"orclNetROInterfaceName", NULL}

Thus, by generating queries such as those above, client system 110_A may retrieve all the required information from directory server 160, and generate the RPC requests. The overall operation is summarized below.

12. Overall Operation Summary

The schema (FIGS. 4A and 4B), which specifies the grammar using which the interface(s) information is represented, is saved on directory server 160. This is a one_time operation.

Each RPC server system 180_A and 180_B generates entries as described in Appendix B and stores these entries on directory server 160 in a known way (to make the corresponding RPC service information accessible to client systems 110_A and 110_B). As noted above, each RPC server system 180_A can provide different/custom service interface as well as access controls for the same service.

If the service definition changes in between, RPC server 180_A may regenerate the entries to reflect the change, and modify the entry with the new content again on directory server 160. As a result, change of information is dynamically reflected at least in RPC queries received thereafter. In addition, each service is defined in a corresponding object sub_tree stored in the directory server. The storing is performed in a known way.

Client systems 110_A and 110_B can query directory server 160 to retrieve the information related to each service of interest, for example, as described above. Once the information on the service of interest (and the procedure interface) is available, client system 110_A can generate an RPC request (similar to in a prior art situation in which RPC requests are generated based on information in the IDL files provided to the client system), and send the generated request to RPC server 180_A in a known way. The response may also be sent/received in a known way.

Due to the features described above client systems can dynamically discover the RPC services accessible on different RPC servers, and cause execution of desired services. The description is continued with respect to an embodiment in which various features of the present invention are operative by execution of appropriate software instructions.

13. Software Implementation

Figure 5:
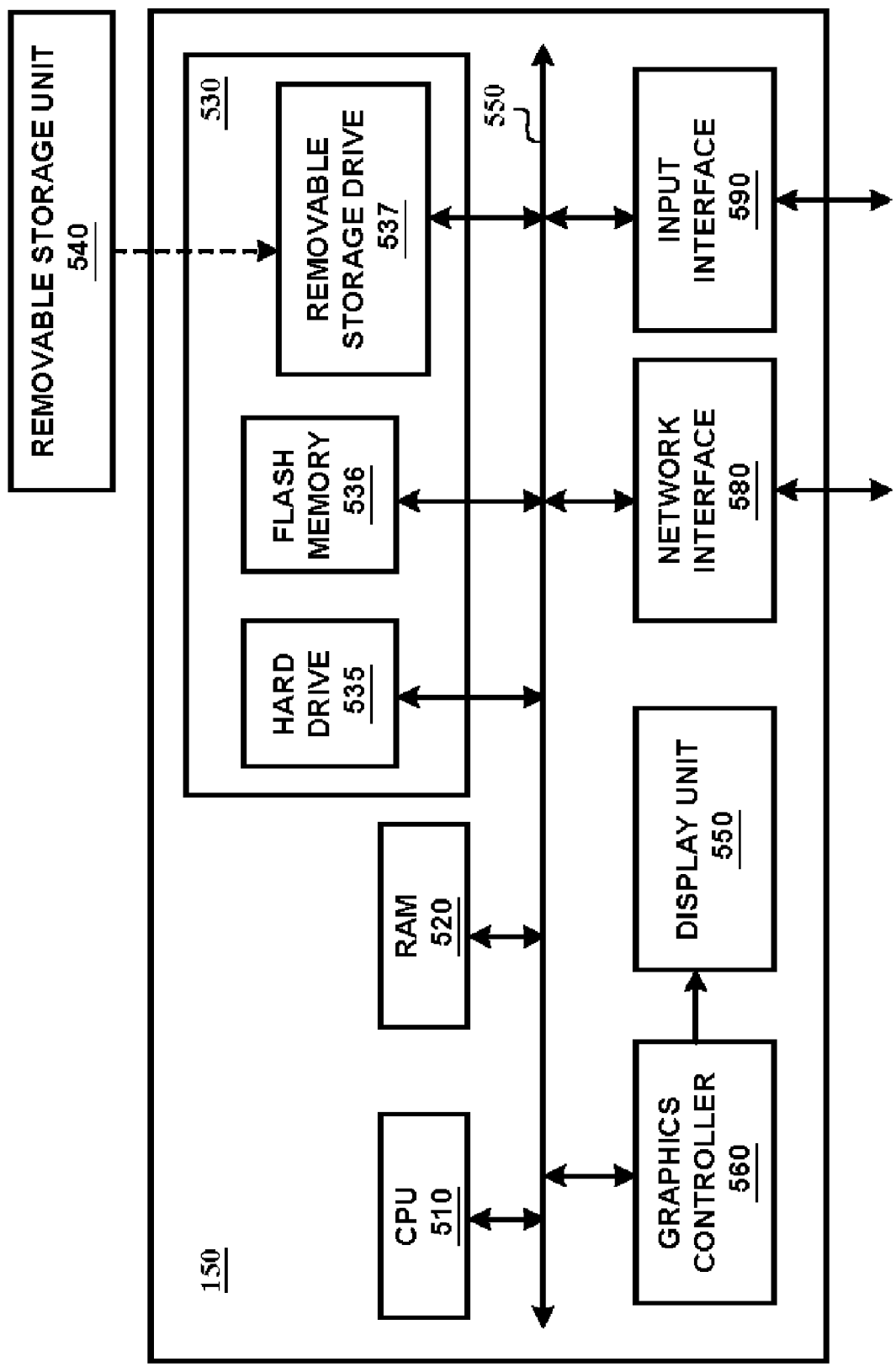
FIG. 5 is a block diagram of a digital processing system in which various aspects of the present invention are operative when corresponding software instructions are executed.

FIG. 5 is a block diagram illustrating the details of digital processing system 500 in which various aspects of the present invention are operative by execution of software instructions. Digital processing system 500 can correspond to one of RPC server systems 180_A and 180_B, client systems 110_A and 110_B, and directory server 160. Digital processing system 500 may contain one or more processors such as processing unit 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

Processing unit 510 may execute instructions stored in RAM 520 to provide several features of the present invention. Processing unit 510 may contain multiple processors, with each processor potentially being designed for a specific task. Alternatively, processing unit 510 may contain only a single processor. RAM 520 may receive instructions and data from secondary memory 530 and network interface 580 using communication path 550.

Graphics controller 560 generates display signals (e.g., in RGB format) to display unit 570 based on data/instructions received from processing unit 510. Display unit 570 contains a display screen to display the images defined by the display signals. Input interface 590 may correspond to a key?board and/or mouse, and generally enables a user to provide various inputs (e.g., request/query). Network interface 580 enables some of the inputs (and outputs) to be provided on a network and also to interface with other systems over network 150. Display unit 570, input interface 590 and network interface 580 may be implemented in a known way.

Secondary memory 530 may contain hard drive 535, flash memory 536 and removable storage drive 537. Secondary memory 230 may store the data and software instructions which cause digital processing system 500 to provide several features in accordance with the present invention. Some or all of the data and instructions may be provided on removable storage unit 540, and the data and instructions may be read and provided by removable storage drive 537 to processing unit 510. Floppy drive, magnetic tape drive, CD?ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data.

In this document, the term "computer program product@ is used to generally refer to removable storage unit 540 or hard disk installed in hard drive 535. These computer program products are means for providing software to digital processing system 500. Processing unit 510 may retrieve the software instructions, and execute the instructions to provide various features of the present invention as described herein.

Thus, various features of the present invention enable client systems to discover services accessible by remote procedure calls (RPC) on server systems.

14. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

APPENDIX A 1. dn: cn=subschemasubentry
2. changetype: modify
3. add: attribute types
4. attribute types: (<oid_prefix>.1 NAME 'orclNetROInterfaceName'
5. DESC 'the name of the Remote Operations based interface'
6. EQUALITY caseExactMatch
7. SUBSTR caseExactSubstringsMatch
8. SYNTAX 1.3.6.1.4.1.1466.115.121.1.15 SINGLE_VALUE)
9. attribute types: (<oid_prefix>.2 NAME 'orclNetROInterfaceBinaryAttribute'
10. DESC 'object descriptor of an interface instance is stored as binary'
11. EQUALITY caseExactMatch
12. SUBSTR caseExactSubstringsMatch
13. SYNTAX 1.3.6.1.4.1.1466.115.121.1.5 SINGLE_VALUE)
15. attribute types: (<oid_prefix>.3 NAME 'orclNetROSvcReg'
16. DESC 'the name under which the interface is registered'
17. EQUALITY caseExactMatch
18. SUBSTR caseExactSubstringsMatch
19. SYNTAX 1.3.6.1.4.1.1466.115.121.1.15 SINGLE_VALUE)
21. attribute types: (<oid_prefix>.4 NAME 'orclNetROInterfaceAttributeName'
22. DESC 'the name of the interface attribute'
23. EQUALITY caseExactMatch
24. SUBSTR caseExactSubstringsMatch
25. SYNTAX 1.3.6.1.4.1.1466.115.121.1.15 SINGLE_VALUE)
27. attribute types: (<oid_prefix>.5 NAME 'orclNetROInterfaceAttributeParameterName'
28. DESC 'the name of the parameter to interface attribute'
29. EQUALITY caseExactMatch
30. SUBSTR caseExactSubstringsMatch
31. SYNTAX 1.3.6.1.4.1.1466.115.121.1.15 SINGLE_VALUE)
33. attribute types: (<oid_prefix>.6 NAME 'orciNetROInterfaceAttributeParameterArgument'
34. DESC 'the argument to the interface attribute parameter'
35. EQUALITY caseExactMatch
36. SUBSTR caseExactSubstringsMatch
37. SYNTAX 1.3.6.1.4.1.1466.115.121.1.15 MULTI_VALUE)
39. attribute types: (<oid_prefix>.7 NAME 'orciNetROInterfaceAttributeParameterType'
40. DESC 'the type of the interface attribute parameter'
41. EQUALITY caseExactMatch
42. SUBSTR caseExactSubstringsMatch
43. SYNTAX 1.3.6.1.4.1.1466.115.121.1.15 SINGLE_VALUE)
45. attribute types: (<oid_prefix>.8 NAME 'orclNetROInterfaceAttributeParameterValue'
46. DESC 'the value of the interface attribute parameter'
47. EQUALITY caseExactMatch
48. SUBSTR caseExactSubstringsMatch
49. SYNTAX 1.3.6.1.4.1.1466.115.121.1.15 SINGLE_VALUE)
51. attribute types: (<oid_prefix>.9 NAME 'orclNetROTypeName'
52. DESC 'the name of the scalar or aggregate data type'
53. EQUALITY caseExactMatch
54. SUBSTR caseExactSubstringsMatch
55. SYNTAX 1.3.6.1.4.1.1466.115.121.1.15 SINGLE_VALUE)
57. attribute types: (<oid_prefix>.10 NAME 'orclNetROTypeKind'
58. DESC 'the type for instance int or typedef struct'
59. EQUALITY caseExactMatch
60. SUBSTR caseExactSubstringsMatch
61. SYNTAX 1.3.6.1.4.1.1466.115.121.1.15 SINGLE_VALUE)
63. attribute types: (<oid_prefix>.11 NAME 'orclNetROTypeMemberOf'
64. DESC 'the member of which aggregate'
65. EQUALITY caseExactMatch
66. SUBSTR caseExactSubstringsMatch
67. SYNTAX 1.3.6.1.4.1.1466.115.121.1.15 SINGLE_VALUE)
69. attribute types: (<oid_prefix>.12 NAME 'orclNetROTypeAggregateSize'
70. DESC 'the size of the aggregate'

71. EQUALITY caseExactMatch
72. SUBSTR caseExactSubstringsMatch
73. SYNTAX 1.3.6.1.4.1.1466.115.121.1.15 SINGLE_VALUE)
75. attribute types: (<oid_prefix>.13 NAME 'orclNetRO-TypeAttributeName'
76. DESC 'the name of the attribute for this type'
77. EQUALITY caseExactMatch
78. SUBSTR caseExactSubstringsMatch
79. SYNTAX 1.3.6.1.4.1.1466.115.121.1.15 SINGLE_VALUE)
81. attribute types: (<oid_prefix>.14 NAME 'orclNetRO-TypeAttributeParameter'
82. DESC 'the parameter for the attribute of this type'
83. EQUALITY caseExactMatch
84. SUBSTR caseExactSubstringsMatch
85. SYNTAX 1.3.6.1.4.1.1466.115.121.1.15 SINGLE_VALUE)
87. attribute types: (<oid_prefix>.15 NAME 'orclNetRO-ProcedureName'
88. DESC 'the name of the procedure'
89. EQUALITY caseExactMatch
90. SUBSTR caseExactSubstringsMatch
91. SYNTAX 1.3.6.1.4.1.1466.115.121.1.15 SINGLE_VALUE)
92. attribute types: (<oid_prefix>.16 NAME 'orclNetRO-Prototype'
93. DESC 'the prototype declaration for the procedure'
94. EQUALITY caseExactMatch
95. SUBSTR caseExactSubstringsMatch
96. SYNTAX 1.3.6.1.4.1.1466.115.121.1.15 SINGLE_VALUE)
98. attribute types: (<oid_prefix>.17 NAME 'orclNetRO-ParameterName'
99. DESC 'the parameter to this procedure'
100. EQUALITY caseExactMatch
101. SUBSTR caseExactSubstringsMatch
102. SYNTAX 1.3.6.1.4.1.1466.115.121.1.15 SINGLE_VALUE)
104. attribute types: (<oid_prefix>.18 NAME 'orclNetROParameterType'
105. DESC 'the type of the parameter'
106. EQUALITY caseExactMatch
107. SUBSTR caseExactSubstringsMatch
108. SYNTAX 1.3.6.1.4.1.1466.115.121.1.15 SINGLE_VALUE)
110. attribute types: (<oid_prefix>.19 NAME 'orclNetROParameterAttributeName'
111. DESC 'the attribute for the parameter of the procedure'
112. EQUALITY caseExactMatch
113. SUBSTR caseExactSubstringsMatch
114. SYNTAX 1.3.6.1.4.1.1466.115.121.1.15 SINGLE_VALUE)
116. attribute types: (<oid_prefix>.20 NAME 'orclNetROParameterAttributeArgument'
117. DESC 'the arguments to the attribute for the parameter of the procedure'
118. EQUALITY caseExactMatch
119. SUBSTR caseExactSubstringsMatch
120. SYNTAX 1.3.6.1.4.1.1466.115.121.1.15 MULTI_VALUE)
121. _
122. add: objectclasses
123. objectclasses: (<oid_prefix>.23 NAME 'orclNetROInterfaceObject'
124. DESC 'the root of the entire object tree specific to this interface'
125. SUP orclContainer
126. AUXILIARY MUST (orclNetROinterfaceName $ orclNetROSvcReg $ orclaci)
127. MAY (description))
129. objectclasses: (<oid_prefix>.24 NAME 'orclNetROInterfaceBinaryObject'
130. DESC 'object descriptor associated with a interface is stored in binary form'
131. SUP orclNetROInterfaceObject
132. AUXILIARY MUST (orclNetROInterfaceBinaryAttribute)
133. MAY (description))
135. objectclasses: (<oid_prefix>.25 NAME 'orclNetROInterfaceAttributeObject'
136. DESC 'the attribute of the interface'
137. SUP orclNetROInterfaceObject
138. AUXILIARY MUST orclNetROInterfaceAttributeName
139. MAY (description))
141. objectclasses: (<oid_prefix>.26 NAME 'orclNetROInterfaceAttributeParameterObject'
142. DESC 'the parameter for the attribute of the interface'
143. SUP orclNetROInterfaceAttributeObject
144. AUXILIARY MUST orclNetROinterfaceAttributeParameterName
145. MAY (orclNetROInterfaceAttributeParameterArgument $
146. orclNetROInterfaceAttributeParameterType $ orclNetROInterfaceAttributeParameterValue $
147.description))
149. objectclasses: (<oid_prefix>.27 NAME 'orclNetROTypeObject'
150. DESC 'the scalar or aggregate type defined in the interface'
151. SUP orclNetROInterfaceObject
152. AUXILIARY MUST (orclNetROTypeName $ orclNetROTypeKind)
153. MAY (orclNetROTypeMemberOf $ orclNetROTypeAggregateSize $ description))
155. objectclasses: (<oid_prefix>.28 NAME 'orclNetROTypeAttributeObject'
156. DESC 'the attribute of the scalar or aggregate type'
157. SUP orclNetROTypeObject
158. AUXILIARY MUST orclNetROTypeAttributeName
159. MAY (orclNetROTypeAttributeParameter $ description))
161. objectclasses: (<oid_prefix>.29 NAME 'orclNetROProcedureObject'
162. DESC 'the procedure within the interface'
163. SUP orclNetROInterfaceObject
164. AUXILIARY MUST (orclNetROProcedureName $ orclNetROPrototype)
165. MAY (description))
167. objectclasses: (<oid_prefix>.30 NAME 'orclNetROProcedureParameterObject'
168. DESC 'all the parameters including return type of the procedure'
169. SUP orclNetROProcedureObject
170. AUXILIARY MUST (orclNetROParameterName $ orclNetROParameterType
171. MAY (description))
173. objectclasses: (<oid_prefix>.31 NAME 'orclNetROProcedureParameterAttributeObject'

174. DESC 'the attribute for all the parameters including return types of the procedure'
175. SUP orclNetROProcedureParameterObject
176. AUXILIARY MUST (orclNetROParameterAttributeName)
177. MAY (orclNetROParameterAttributeArgument $ description))
178. _
179. dn: cn=catalogs
180. changetype: modify
181. add: orclindexedattribute
182. orclindexedattribute: orclNetROInterfaceName
184. dn: cn=catalogs
185. changetype: modify
186. add: orclindexedattribute
187. orclindexedattribute: orclNetROSvcReg
189. dn: cn=catalogs
190. changetype: modify
191. add: orclindexedattribute
192. orclindexedattribute: orclNetROInterfaceBinaryAttribute

APPENDIX B 1. dn:
2. cn=OracleNetRemoteOps,cn=OracleNet,cn=Products,cn=OracleContext,%s_SubscriberDN%
3. objectclass: top
4. objectclass: orclContainer
5. cn: orclnetRemoteOps
6. description: An Oracle Net Remote Operations Services system
7. dn:
8. cn=orclnetRemoteOpsInterfaceRegistration, cn=OracleNetRemoteOps,cn=OracleNet,cn=Products, cn=OracleContext,%s_SubscriberDN%
9. objectclass: top
10. objectclass: orclContainer
11. cn: orclnetRemoteOpsinterfaceRegistration
12. description: An Oracle Net Remote Operations Interface Registration sub_system
13. dn:orclNetROInterfaceName=myService, cn=orclnetRemoteOpsInterfaceRegistration, cn=OracleNetRemoteOps,
14. cn=OracleNet,cn=Products,cn=OracleContext,%s_SubscriberDN%
15. objectclass: orclNetROInterfaceObject
16. orclNetROInterfaceName: myService
17. orclNetROSvcReg: server_ldap
18. orclaci: access to attr=(*) by dn="cn=orcladmin, cn=Users, %SUBSCRIBER_DN%" (search, read, write, compare)
19. by * (search, read, nowrite, nocompare)
20. description: The Interface Name for this Oracle Net Remote Operations Interface object
21. dn: orclNetROInterfaceAttributeName=uuid, orclNetROInterfaceName=myService, cn=orclnetRemoteOpsInterfaceRegistration, cn=OracleNet, cn=Products,cn=OracleNetRemoteOps,cn=OracleContext, %s_SubscriberDN%
22. objectclass: orclNetROInterfaceAttributeObject
23. orclNetROInterfaceAttributeName: uuid
24. description: The Interface Attribute for this Oracle Net Remote Operations Interface Attribute object
25. dn: orclNetROInterfaceAttributeParameterName=807B9154B46E_1F65_E034_0800208AB384, orclNetROInterfaceAttributeName=uuid, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
26. objectclass: orclNetROInterfaceAttributeParameterObject
27. orclNetROInterfaceAttributeParameterName: 807B9154B46E_1F65_E034_0800208AB384
28. description: The Interface Attribute Parameter for this Oracle Net Remote Operations Interface Attribute object
29. dn: orclNetROInterfaceAttributeName=version, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
30. objectclass: orclNetROInterfaceAttributeObject
31. orclNetROInterfaceAttributeName: version
32. description: The Interface Attribute for this Oracle Net Remote Operations Interface Attribute object
33. dn: orclNetROInterfaceAttributeParameterName=1, orclNetROInterfaceAttributeName=version, orclNetROInterfaceName=myService, cn=OracleNetRemoteOps, cn=orclnetRemoteOpsInterfaceRegistration,cn=OracleNet, cn=Products,cn=OracleContext,%s_SubscriberDN%
34. objectclass: orclNetROInterfaceAttributeParameterObject
35. orclNetROInterfaceAttributeParameterName: 1
36. description: The Interface Attribute Parameter for this Oracle Net Remote Operations Interface Attribute object
37. dn: orclNetROInterfaceAttributeName=endpoint, orcNetROnterfaceName=myService, cn=orclnetRemoteOpsInterfaceRegistration, cn=OracleNetRemoteOps,cn=OracleNet,cn=Products, cn=OracleContext,%s_SubscriberDN%
38. objectclass: orclNetROInterfaceAttributeObject
39. orclNetROInterfaceAttributeName: endpoint
40. description: The Interface Attribute for this Oracle Net Remote Operations Interface Attribute object
41. dn: orclNetROInterfaceAttributeParameterName=RSLV,orclNetROInterfaceAttributeName=endpoint, orclNetROInterfaceName=myService, cn=orclnetRemoteOpsInterfaceRegistration, cn=OracleNetRemoteOps,cn=OracleNet,cn=Products,
42. cn=OracleContext,%s_SubscriberDN%
43. objectclass: orclNetROInterfaceAttributeParameterObject
44. orclNetROInterfaceAttributeParameterName: RSLV
45. description: The Interface Attribute Parameter for this Oracle Net Remote Operations Interface Attribute object
46. dn: orclNetROInterfaceAttributeName=address_desc, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
47. objectclass: orclNetROInterfaceAttributeObject
48. orclNetROInterfaceAttributeName: address_desc
49. description: The Interface Attribute for this Oracle Net Remote Operations Interface Attribute object
50. dn: orclNetROInterfaceAttributeParameterName=service_endpoint, orclNetROInterfaceAttributeName=address_desc, orclNetROInterfaceName=myService, cn=orclnetRemoteOpsInterfaceRegistration, cn=OracleNetRemoteOps,cn=OracleNet,cn=Products,
51. cn=OracleContext,%s_SubscriberDN%
52. objectclass: orclNetROInterfaceAttributeParameter 53. orclNetROInterfaceAttributeParameterName: service_endpoint
54. description: The Interface Attribute Parameter for this Oracle Net Remote Operations Interface Attribute object
55. dn: orclNetROInterfaceAttributeName=rslv_server, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
56. objectclass: orclNetROInterfaceAttributeObject
57. orclNetROInterfaceAttributeName: rslv_server
58. description: The Interface Attribute for this Oracle Net Remote Operations Interface Attribute object
59. dn: orclNetROInterfaceAttributeParameterName=ANSWER,orclNetROInterfaceAttributeName=rslv_server, orclNetROInterfaceName=myService, cn=orclnetRemoteOpsInterfaceRegistrationcn=OracleNetRemoteOps,cn=OracleNet,cn=Products,
60. cn=OracleContext,%s_SubscriberDN%
61. objectclass: orclNetROInterfaceAttributeParameterObject
62. orclNetROInterfaceAttributeParameterName: ANSWER
63. description: The Interface Attribute Parameter for this Oracle Net Remote Operations Interface Attribute object
64. dn: orclNetROTypeName=aggregate1_t, orclNetROTypeKind=typedefstruct, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
65. objectclass: orclNetROTypeObject
66. orclNetROTypeName: aggregate1_t
67. orclNetROTypeKind: typedef struct
68. description: The Type for this Oracle Net Remote Operations Interface object
69. dn: orclNetROTypeName=member1_aggregate1, orclNetROTypeMemberOf=aggregate1_t, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
70. objectclass: orclNetROTypeObject
71. orclNetROTypeName: member1_aggregate1
72. orclNetROTypeKind: ub4
73. orclNetROTypeMemberOf: aggregate1_t
74. orclNetROTypeAggregateSize: 2
75. description: The Type for this Oracle Net Remote Operations Interface object
76. dn: orclNetROTypeAttributeName=size_in, orclNetROTypeName=member1_aggregate1, orclNetROTypeMemberOf=aggregate1_t, orclNetROInterfaceName=myService, cn=orclnetRemoteOpsInterfaceRegistration, cn=OracleNetRemoteOps,cn=OracleNet,cn=Products,
77. cn=OracleContext, %s_SubscriberDN%
78. objectclass: orclNetROTypeAttributeObject
79. orclNetROTypeAttributeName: size_in
80. orclNetROTypeName: member1_aggregate1
81. orclNetROTypeKind: ub4
82. orclNetROTypeMemberof: aggregate1_t
83. orclNetROTypeAggregateSize: 2
84. orclNetROTypeAttributeParameter: _1
85. description: The Attribute for Oracle Net Remote Operations Interface Type object
86. dn: orclNetROTypeName=member2_aggregate1, orclNetROTypeMemberOf=aggregate1_t, orclNetROInterfaceName=myService, cn=orclnetRemoteOpsInterfaceRegistration, cn=OracleNetRemoteOps,cn=OracleNet,cn=Products, cn=OracleContext, %s_SubscriberDN%
87. objectclass: orclNetROTypeObject
88. orclNetROTypeName: member2_aggregate1
89. orclNetROTypeKind: oratext*
90. orclNetROTypeMemberOf: aggregate1_t
91. description: The Type for this Oracle Net Remote Operations Interface object
92. dn:orclNetROTypeName=maxlength, orclNetROInterfaceName=myService, cn=orclnetRemoteOpsInterfaceRegistration,
93. cn=OracleNetRemoteOps,cn=OracleNet, cn=Products,cn=OracleContext,%s_SubscriberDN%
94. objectclass: orclNetROTypeObject
95. orclNetROTypeName: maxlength
96. orclNetROTypeKind: typedef ubig_ora
97. description: The Type for this Oracle Net Remote Operations Interface object
98. dn: orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
99. objectclass: orclNetROProcedureObject
100. orclNetROProcedureName: remoteproc1
101. orclNetROPrototype: [size_is(maxlength)]sb4 [ptrmemory]remoteproc1 ([in] aggregate1_t parameter1,[in, out] ub4*parameter2)
102. description: The Procedure for this Oracle Net Remote Operations Interface object
103. dn: orclNetROParameterName=returntype, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext, %s_SubscriberDN%
104. objectclass: orclNetROProcedureParameterObject
105. orclNetROParameterName: returntype
106. orclNetROParameterType: sb4
107. orclNetROProcedureName: remoteproc1
108. description: The Procedure Parameter for this Oracle Net Remote Operations Interface Procedure object
109. dn: orclNetROParameterAttributeName=size_is, orclNetROParameterName=returntype, orclNetROParameterType=sb4, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
110. objectclass: orclNetROProcedureParameterAttributeObject
111. orclNetROParameterAttributeName: size_is
112. orclNetROParameterAttributeArgument: maxlength
113. description: The Procedure Parameter Attribute for this Oracle Net Remote Operations Interface Procedure object
114. dn: orclNetROParameterName=parameter1, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext, %s_SubscriberDN%
115. objectclass: orclNetROProcedureParameterObject
116. orclNetROParameterName: parameter1

117. orclNetROParameterType: aggregate1_t
118. orclNetROProcedureName: remoteproc1
119. description: The Procedure Parameter for this Oracle Net Remote Operations Interface Procedure object
120. dn: orclNetROParameterAttributeName=in, orclNetROParameterName=parameter1, orclNetROProcedureName=remoteproc1, orclNetROInterfaceName=myService, cn=orclnetRemoteOpsInterfaceRegistration, cn=OracleNetRemoteOps,cn=OracleNet,cn=Products,
121. cn=OracleContext, %s_SubscriberDN%
122. objectclass: orclNetROProcedureParameterAttributeObject
123. orclNetROParameterAttributeName: in
124. description: The Procedure Parameter Attribute for this Oracle Net Remote Operations Interface Procedure object
125. dn: orclNetROParameterName=parameter2, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
126. objectclass: orclNetROProcedureParameterObject
127. orclNetROParameterName: parameter2
128. orclNetROParameterType: ub4*
129. orclNetROProcedureName: remoteproc1
130. description: The Procedure Parameter for this Oracle Net Remote Operations Interface Procedure object
131. dn: orclNetROParameterAttributeName=in, orclNetROParameterName=parameter2, orclNetROParameterType=ub4*, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
132. objectclass: orclNetROProcedureParameterAttributeObject
133. orclNetROParameterAttributeName: in
134. description: The Procedure Parameter Attribute for this Oracle Net Remote Operations Interface Procedure object
135. dn:
136. orclNetROParameterAttributeName=out, orclNetROParameterName=parameter2, orclNetROParameterType=ub4*, orclNetROProcedureName=remoteproc1, orclNetROInterfaceName=myService, cn=orclnetRemoteOpsInterfaceRegistration, cn=OracleNetRemoteOps,cn=OracleNet,cn=Products, cn=OracleContext,%s_SubscriberDN%
137. objectclass: orclNetROProcedureParameterAttributeObject
138. orclNetROParameterAttributeName: out
139. description: The Procedure Parameter Attribute for this Oracle Net Remote Operations Interface Procedure object

What is claimed is:

1. A method of enabling client systems to execute remote procedure call (RPC) services on a plurality of RPC servers, said method comprising:
registering on a directory server an interface definition including a procedure interface which specifies an interface using which the RPC service is executed on the RPC server by said client systems, said interface definition containing a procedure identifier and one or more arguments of corresponding types;
sending a query request from a first client system contained in said client systems to said directory server, said query request requesting said interface definition using which said RPC service is executed;
receiving a query response from said directory server in said first client system, wherein said query response contains said interface definition; and
sending an RPC request according to said interface definition from said first client system to said RPC server to cause execution of said RPC service on said RPC server, wherein said query response is received by said first client system from said directory server as a response to said query request.

2. The method of claim 1, wherein said query response from said directory server further indicates a service interface using which said RPC service is capable of being accessed on said one of said RPC servers, and wherein said RPC request is sent according to said service interface from said first client system to said one of said RPC servers.

3. The method of claim 2, wherein said service interface contains a port number at which said RPC service is accessible on said one of said first set of RPC servers.

4. The method of claim 2, wherein said service interface stored on said directory server further contains access control restrictions in accessing said RPC service provided on each of said RPC servers.

5. The method of claim 2, wherein said first client system requests a set of RPC servers on which said RPC service is capable of being executed, said query response indicatinq said set of RPC servers includinq said RPC server are capable of executing said RPC service, wherein said RPC request is sent to said RPC server based on receiving said query response.

6. The method of claim 5, wherein said procedure interface contains a set of parameters, corresponding attributes, and whether each of said set of parameters is of input type, output type or both.

7. The method of claim 6, wherein said procedure interface and said service interface are represented as objects according to a schema.

8. The method of claim 7, wherein said set of parameters and said attributes are also represented as objects according to said schema.

9. The method of claim 8, wherein said schema defines said objects related to said set of parameters and said attributes in a hierarchy.

10. The method of claim 5, wherein each of said set of RPC servers registers with said directory server a corresponding set of services accessible on the RPC server.

11. The method of claim 10, wherein said RPC servers perform said registration at a time of corresponding initialization.

12. The method of claim 1, wherein said directory server and said one of said RPC servers are implemented as separate systems connected by one or more networks.

13. A method of facilitating client systems to execute remote procedure calls (RPC) on RPC servers, providing information on a procedure interface wherein said procedure interface contains a procedure identifier and a plurality of arguments, said plurality of arguments being of a corresponding plurality of types, said method being implemented in a digital processing system directory server provided external to said RPC servers and said client systems, and being connected to each of said RPC servers and said client systems by one or more networks, said method comprising:

storing an interface definition representing a procedure interface in a memory provided in said directory server, wherein said procedure interface definition specifies an interface, using which the RPC service is executed on one or more of said RPC servers by said client systems, said procedure interface definition containing a procedure identifier and a plurality of arguments, said plurality of arguments being of a corresponding plurality of types;

receiving a query from a first client system, requesting said interface definition for said RPC service according to a schema;

accessing said memory to determine the information requested in said query; and sending a query response to said first client system, said query response containing the determined information representing said interface definition according to said schema, wherein said first client system executes said RPC service on any of said one or more of said RPC servers based on said interface definition in said query response.

14. The method of claim 13, wherein said procedure interface is stored in said memory according to said schema.

15. The method of claim 14, wherein said procedure interface is contained in a service accessible as a remote procedure call (RPC) in a RPC server.

16. The method of claim 13, wherein said query requests a set of RPC servers designed to execute said RPC service, and wherein said response also includes data indicating said one or more of said RPC servers are designed to execute said RPC service.

17. A method of facilitating client systems to execute remote procedure call (RPC) services on a plurality of RPC servers, said method being implemented on a client system, said method comprising:

sending a directory query to a directory server, said directory query requesting an interface definition, using which said RPC service is executed;

receiving a response from said directory server, said response contains said interface definition representing a procedure interface, wherein said procedure interface definition specifies an interface, using which said RPC service is executed on one or more RPC servers, said procedure interface definition containing a procedure identifier and a plurality of arguments, said plurality of arguments being of a corresponding plurality of types; and sending an RPC service request according to said interface definition to execute said RPC service on said RPC server, wherein said directory server is provided external to said RPC server and said client system, and being connected to each of said RPC server and said client system by corresponding one or more networks.

18. The method of claim 17, further comprising: requesting said directory server to specify a service interface; and receiving said service interface from said directory server, wherein said RPC service request is sent to said RPC server according to said service interface.

19. The method of claim 18, wherein said service interface contains a port number at which said RPC service is accessible on said RPC server.

20. The method of claim 19, wherein said service interface further contains access control restrictions in accessing said service provided on each of said RPC servers.

21. The method of claim 17, wherein said response contains identity of one or more RPC servers including said RPC server at which said RPC service is executed, wherein said RPC request is sent to said RPC server based on the identity of said RPC server received in said response.

22. The method of claim 21, wherein said procedure interface further comprises a set of parameters, corresponding attributes, and whether each of said set of parameters is of input type, output type or both, and said data representing said procedure interface containing said set of parameters, corresponding attributes and indication of whether each of said set of parameters is of input type, output type or both.

23. The method of claim 22, wherein said procedure interface and said service interface are represented as objects according to a schema.

24. A computer readable medium carrying one or more sequences of instructions for causing a directory server to provide information on a procedure interface to facilitate client systems to execute remote procedure calls (RPC) services on RPC servers, wherein said procedure interface contains a procedure identifier and a plurality of arguments, said plurality of arguments being of a corresponding plurality of types, wherein said directory server is provided external to said RPC servers and said client systems, and being connected to each of said RPC servers and client systems by one or more networks and execution of said one or more sequences of instructions by one or more processors contained in said directory server system causes said directory server system to perform the actions of:

storing an interface definition representing a procedure interface in a memory provided in said directory server, wherein said procedure interface definition specifies an interface, using which the RPC service is executed on one or more of said RPC servers by said client systems, said procedure interface definition containing a procedure identifier and a plurality of arguments, said plurality of arguments being of a corresponding plurality of types;

receiving a query from a first client system, requesting information according to a schema;

accessing said memory to determine the information requested on said procedure interface definition in said query; and sending a query response to said first client system, said query response containing the determined information representing said procedure interface definition according to said schema, wherein said first client system executes said RPC service on any of said one or more of said RPC servers based on said interface definition in said query response.

25. The computer readable medium of claim 24, wherein said procedure interface is stored in said memory according to said schema.

26. The computer readable medium of claim 25, wherein said procedure interface is contained in a service accessible as a remote procedure call (RPC) in a RPC server.

27. A computer readable medium carrying one or more sequences of instructions for causing a client system to execute a remote procedure call (RPC) service, wherein execution of said one or more sequences of instructions by one or more processors contained in said client system causes said client system to perform the actions of:

sending a directory query to a directory server, said directory query requesting an interface definition using which said RPC service is executed;

receiving a response from said directory server, said response contains said interface definition representing a procedure interface, wherein said procedure interface definition specifies an interface using which said RPC service is executed on one or more RPC servers, said procedure interface definition containing a procedure identifier and a plurality of arguments said plurality of arguments being of a corresponding plurality of types; and sending an RPC service request according to said procedure interface definition to said identified RPC server to execute said service on a RPC server, wherein said directory server is provided external to said RPC server and said client system, and being connected to each of said RPC server and said client system by corresponding one or more networks.

28. The computer readable medium of claim 27, further comprising:

requesting said directory server to specify a service interface on said RPC server ; and receiving said service interface from said directory server, wherein said RPC service request is sent to said RPC server according to said service interface.

29. The computer readable medium of claim 28, wherein said service interface contains a port number at which said service is accessible on said RPC server.

30. The computer readable medium of claim 29, wherein said service interface further contains access control restrictions in accessing said RPC service provided on each of said RPC servers.

31. The computer readable medium of claim 27, wherein said response contains identity of one or more RPC servers including said RPC server at which said RPC service request is executed, wherein said RPC service request is sent to said RPC server based on the identity of said RPC server received in said response.

32. The computer readable medium of claim 31, wherein said procedure interface further comprises a set of parameters, corresponding attributes, and whether each of said set of parameters is of input type, output type or both, and said data representing said procedure interface containing said set of parameters, corresponding attributes and indication of whether each of said set of parameters is of input type, output type or both.

33. The computer readable medium of claim 32, wherein said procedure interface and said service interface are represented as objects according to a schema.

* * * * *

UNITED STATES PATENT AND TRADEMARK OFFICE
CERTIFICATE OF CORRECTION

| | | |
|---|---|---|
| PATENT NO. | : 7,366,734 B2 | Page 1 of 1 |
| APPLICATION NO. | : 10/905298 | |
| DATED | : April 29, 2008 | |
| INVENTOR(S) | : Gaurab Paul | |

It is certified that error appears in the above-identified patent and that said Letters Patent is hereby corrected as shown below:

In the front page, replace, the address of inventor Gaurab Paul, "Redwood Shores" with --Bangalore--

Col. 22, Line 31, replace "indicatinq" with --indicating--

Col. 22, Line 32, replace "includinq" with --including--

Col. 23, Line 55, replace "each of said RPC server" with --each of said plurality of RPC servers--

Col. 24, Lines 4-5, delete ", based on the identity of said RPC server received in said response" after the word --server--

Col. 25, Line 5, replace "arguments said" with --arguments, said--

Col. 25, Line 18, replace "server ;" with --server;--

Signed and Sealed this

Thirtieth Day of June, 2009

JOHN DOLL
*Acting Director of the United States Patent and Trademark Office*